(12) United States Patent
Kurata et al.

(10) Patent No.: US 9,203,059 B2
(45) Date of Patent: Dec. 1, 2015

(54) BATTERY WITH INSULATING MEMBER INCLUDING BUS BAR FIXING SECTION

(75) Inventors: Kengo Kurata, Saku (JP); Tsutomu Matsui, Saku (JP); Soichi Hanafusa, Saku (JP); Hideyuki Ishii, Maebashi (JP); Tatsuya Shinoda, Himeji (JP); Tsutomu Kanetsuna, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 462 days.

(21) Appl. No.: 12/868,424

(22) Filed: Aug. 25, 2010

(65) Prior Publication Data

US 2011/0052970 A1 Mar. 3, 2011

(30) Foreign Application Priority Data

Aug. 26, 2009 (JP) ................. 2009-195367

(51) Int. Cl.
| | |
|---|---|
| *H01M 2/02* | (2006.01) |
| *H01M 2/04* | (2006.01) |
| *H01M 2/20* | (2006.01) |
| *H01M 2/30* | (2006.01) |
| *H01M 6/42* | (2006.01) |
| *H01M 2/06* | (2006.01) |
| *H01M 2/08* | (2006.01) |
| *H01M 2/22* | (2006.01) |
| *H01M 2/34* | (2006.01) |

(52) U.S. Cl.
CPC .............. *H01M 2/0404* (2013.01); *H01M 2/06* (2013.01); *H01M 2/08* (2013.01); *H01M 2/204* (2013.01); *H01M 2/22* (2013.01); *H01M 2/30* (2013.01); *H01M 2/342* (2013.01); *Y10T 29/49108* (2015.01)

(58) Field of Classification Search
CPC ....... H01M 2/22; H01M 2/342; H01M 2/204; H01M 2/30; H01M 2/0404; H01M 2/06; H01M 2/08
USPC .................. 429/158, 179; 29/623.1
See application file for complete search history.

(56) References Cited

U.S. PATENT DOCUMENTS

| | | | | |
|---|---|---|---|---|
| 2003/0091897 | A1* | 5/2003 | Oogaku et al. | 429/181 |
| 2006/0216593 | A1* | 9/2006 | Jung et al. | 429/178 |
| 2007/0166572 | A1* | 7/2007 | Wang | 429/1 |

(Continued)

FOREIGN PATENT DOCUMENTS

| | | | |
|---|---|---|---|
| JP | 2007323952 A | * | 12/2007 |
| JP | 2008-71638 | | 3/2008 |

(Continued)

OTHER PUBLICATIONS

Cho et al., Machine translation of KR 627369 B1, Sep. 2006.*

(Continued)

*Primary Examiner* — Sean P Cullen
(74) *Attorney, Agent, or Firm* — Oblon, McClelland, Maier & Neustadt, L.L.P.

(57) ABSTRACT

According to one embodiment, a battery includes a case, an electrode group, a lid, an external terminal and an insulating member. The external terminal includes a head section and an axial section extended from the head section. The axial section is caulked and fixed into a through hole in the lid. The insulating member is arranged between the lid and the external terminal. The insulating member includes a bus bar-fixing section.

15 Claims, 12 Drawing Sheets

(56) References Cited

U.S. PATENT DOCUMENTS

| | | | |
|---|---|---|---|
| 2010/0227212 A1* | 9/2010 | Kim | 429/158 |
| 2010/0266887 A1* | 10/2010 | Sekino et al. | 429/123 |
| 2011/0052977 A1* | 3/2011 | Kurata et al. | 429/179 |

FOREIGN PATENT DOCUMENTS

| | | |
|---|---|---|
| JP | 2009-87542 | 4/2009 |
| JP | 2009-87720 | 4/2009 |
| JP | 2009-87722 | 4/2009 |
| JP | 2009-87761 | 4/2009 |
| KR | 627369 B1 * | 9/2006 |
| WO | WO 2009041018 A1 * | 4/2009 |

OTHER PUBLICATIONS

Okada et al., Machine translation of JP 2007-323952 A, Dec. 2007.*
U.S. Appl. No. 12/825,717, filed Jun. 29, 2010, Kurata, et al.
Japanese Office Action issued Apr. 1, 2014, in Japan Patent Application No. 2010-183351 (with English translation).

* cited by examiner

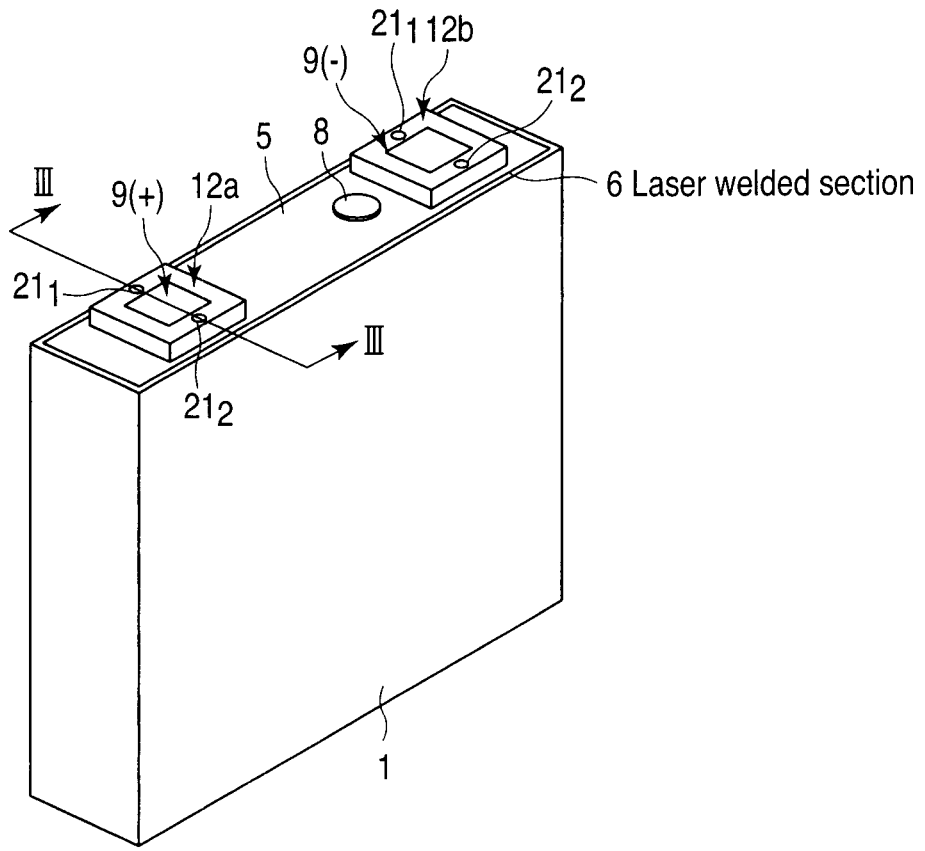
F I G. 2
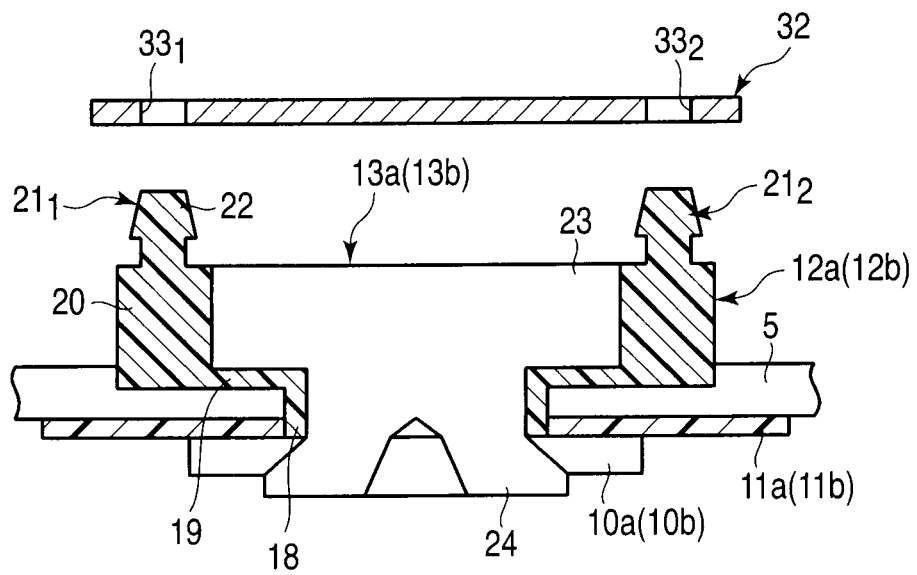
F I G. 3

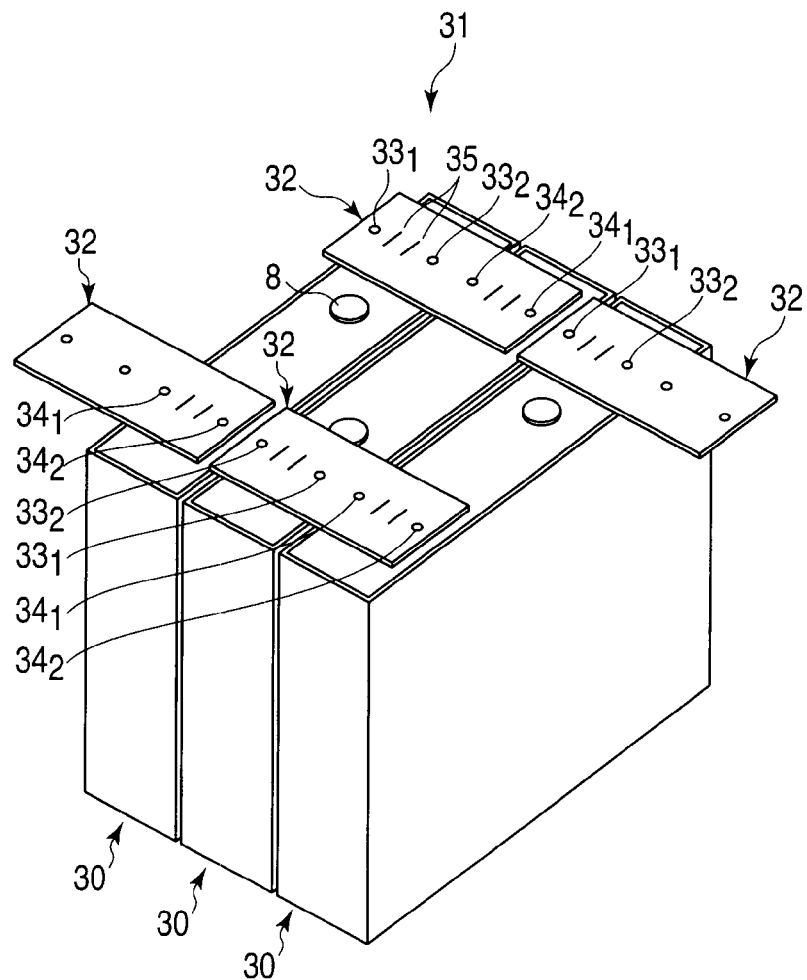
F I G. 4
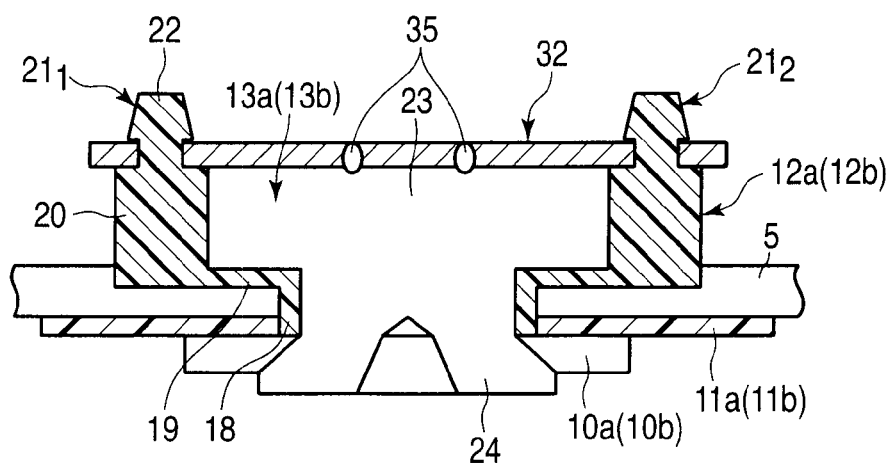
F I G. 5

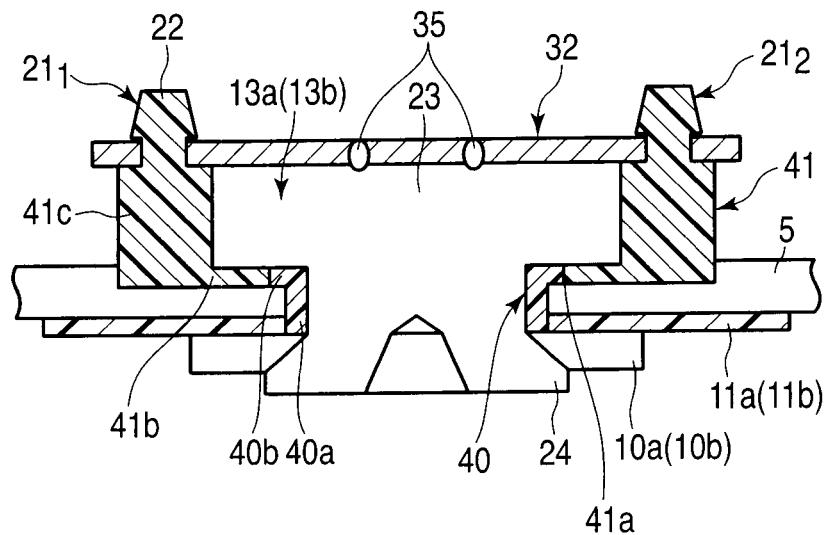
F I G. 6
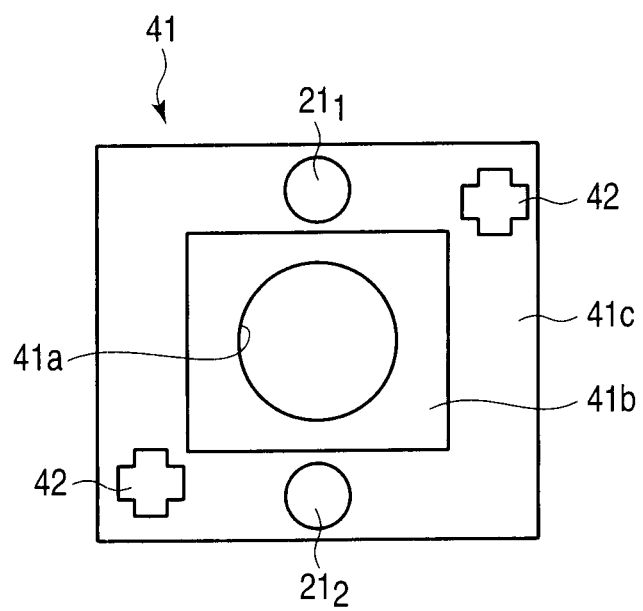
F I G. 7

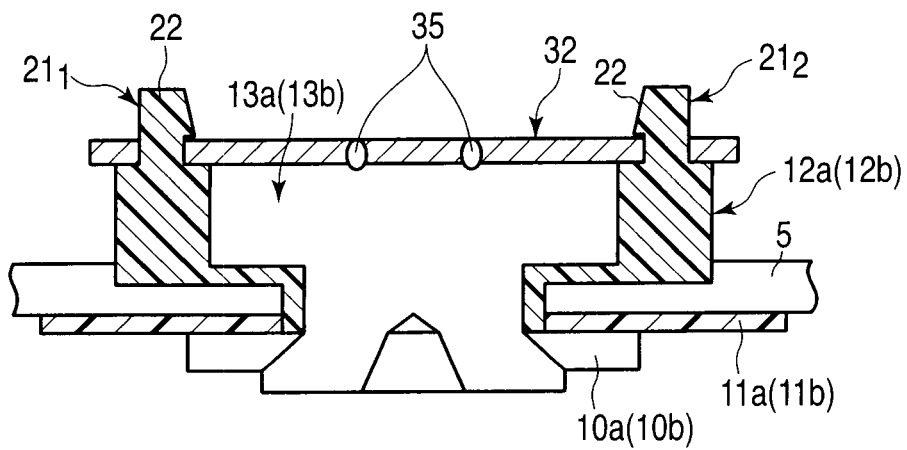
F I G. 8
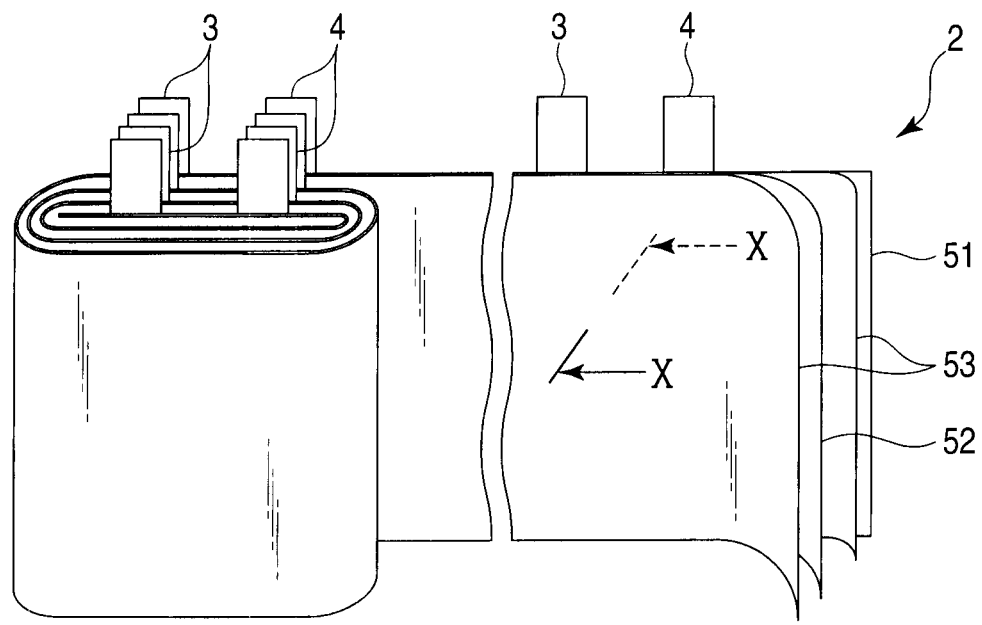
F I G. 9

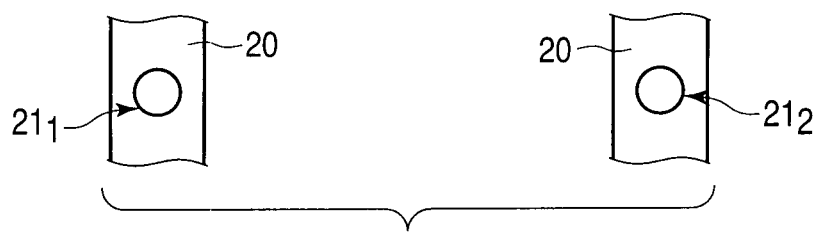
F I G. 14A
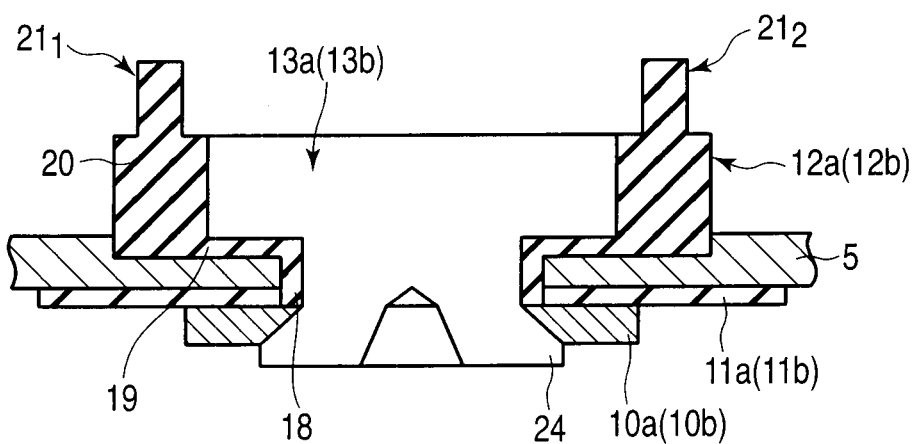
F I G. 14B

BATTERY WITH INSULATING MEMBER INCLUDING BUS BAR FIXING SECTION

CROSS-REFERENCE TO RELATED APPLICATIONS

This application is based upon and claims the benefit of priority from Japanese Patent Application No. 2009-195367, filed Aug. 26, 2009; the entire contents of which are incorporated herein by reference.

FIELD

Embodiments described herein relate generally to a battery, a battery module and a method of manufacturing the battery module.

BACKGROUND

In recent years, a secondary battery, such as a lead storage battery or a nickel hydrogen battery, has been used as a large-size and large-capacity power source, a typical example thereof being a power source for an electric vehicle, a hybrid car, an electric motorbike or a forklift. Recently, developments have been actively made to adopt a lithium ion secondary battery, which is high in energy density. In the developments, increases in the size and the capacity thereof have been advanced while an improvement in the cycle life, the safety and others has been taken into consideration.

As a power source for the above-mentioned vehicles or articles, use is made of a battery pack in which a large number of batteries are connected to each other in series or in parallel since the pack gives a large driving power.

In order to interconnect batteries to each other so as to connect the batteries in series or in parallel, or take out electric energy from the batteries, bus bars are connected to external terminals of the batteries (see, for example, JP-A 2009-87542 (KOKAI), JP-A 2009-87720 (KOKAI), JP-A 2009-87722 (KOKAI) and JP-A 2009-87761 (KOKAI)). The method for connecting bus bars to external terminals is generally a method of making holes in the bus bars, and fastening the hole-made bus bars to bolts formed in the external terminals with screws. A contact resistance is generated between the external terminals and the bus bars fastened thereto with the screws. It is feared that when vibration, or a mechanical force such as impact force is applied to the sections fastened with the screws, the contact resistance is changed.

BRIEF DESCRIPTION OF THE DRAWINGS

FIG. 2 is a perspective view illustrating the external appearance of the battery in FIG. 1;

FIG. 3 is a vertical sectional view taken on line III-III in FIG. 2, and illustrates the section of a caulked section of the battery as viewed along the direction of arrows;

FIG. 4 is a perspective view of a battery module of an embodiment;

FIG. 5 is an enlarged sectional view of bus bar attached sections in the battery module in FIG. 4;

FIG. 6 is an enlarged sectional view of bus bar attached sections in a battery module in which batteries of another embodiment are used;

FIG. 7 is a schematic plan view of an external insulator used in a battery of still another embodiment;

FIG. 8 is an enlarged sectional view of bus bar attached sections in a battery module in which batteries of yet another embodiment are used;

FIG. 9 is a partially-exploded perspective view of an electrode group used in the battery in FIG. 1;

FIG. 14A is a partial top view of an example of each of first and second insulating members used in a battery of an embodiment;

FIG. 14B is a sectional view of caulked sections having the insulating members illustrated in FIG. 14A;

DETAILED DESCRIPTION

Figure 1:
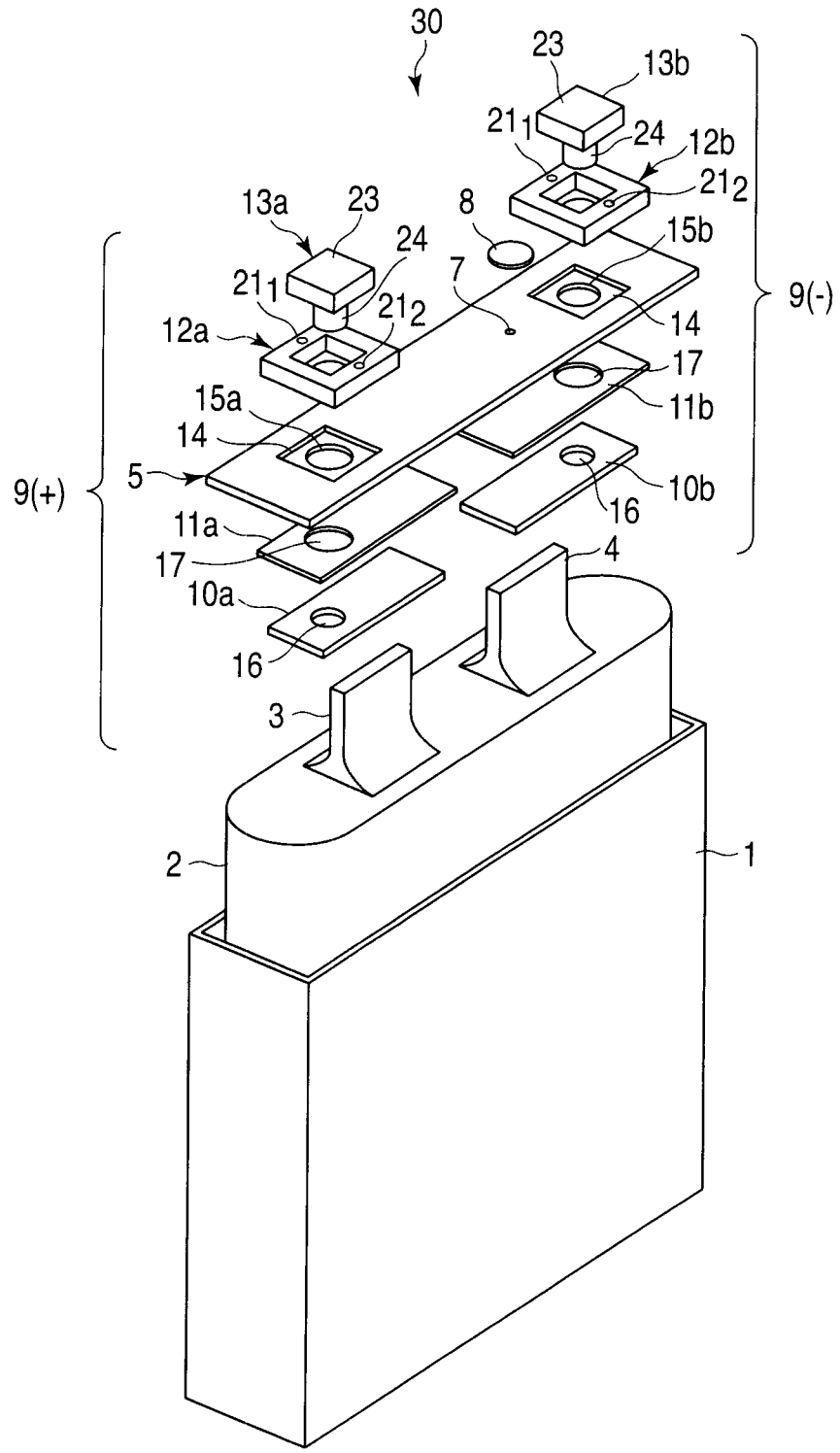
FIG. 1 is an exploded perspective view of a battery of an embodiment.

In general, according to one embodiment, a battery includes a case, an electrode group, a lid, a positive electrode external terminal, a negative electrode external terminal, a first insulating member and a second insulating member.

The electrode group is provided in the case and includes a positive electrode and a negative electrode. The lid is provided to an opening in the case and includes a first through hole and a second through hole.

The positive electrode external terminal includes a head section, and an axial section extended from the head section and caulked and fixed into the first through hole in the lid. The negative electrode external terminal includes a head section, and an axial section extended from the head section and caulked and fixed into the second through hole in the lid.

The first insulating member is arranged between the lid and the positive electrode external terminal. The second insulating member is arranged between the lid and the negative electrode external terminal. The first and second insulating members each include a bus bar-fixing section.

According to the embodiment, a battery module includes the batteries and a bus bar. The bus bar is welded to the head section of the positive electrode external terminal or the negative electrode external terminal of the battery. The bus bar is fixed to the bus bar-fixing section of the first insulating member or the second insulating member.

A method of manufacturing the battery module according to the embodiment includes fixing the bus bar to the bus bar-fixing section of the first or second insulating member, and welding the bus bar to the head section of the positive electrode external terminal or the negative electrode external terminal.

In order to stabilize the bonding resistance between external terminals and bus bars, investigations are being made about bonding the external terminals and the bus bars by laser beam welding, resistance welding, or ultrasonic welding (bonding). When a large number of batteries are lined up, bus bars are arranged onto the batteries and then these members are welded onto each other in order to connect the batteries to each other in series or in parallel, a failure in the welding is frequently caused due to the position gap between the external terminals and the bus bars. In order to prevent the position gap between the external terminals and the bus bars, adopted is a manner of using tools for deciding relative positions between the batteries and the bus bars and fixing these members. When the number of the used tools is large, there is caused a problem that manufacturing costs increase accordingly.

Examples of the welding failure include insufficient weld strength and falling out the bus bars from the external terminals due to the position gap between the external terminals and the bus bars. When a large number of batteries are handled, it becomes difficult to find a welding failure. As a result, the reliability of the battery pack lowers, and further there is generated a risk that a short circuit is caused by the dropped or separated the bus bar.

The embodiments provide a battery and a battery module in which at the time of welding an external terminal and a bus bar to each other, a welding failure due to the position gap between the external terminal and the bus bar is restrained, thereby giving a battery pack high in reliability and safety; and a method of manufacturing the battery module.

With reference to the drawings, batteries according to the embodiments of the invention will be described hereinafter. The invention is not limited to these embodiments.

A battery 30 illustrated in FIG. 1 is a sealed rectangular nonaqueous secondary battery. A case 1 has a bottomed, rectangular cylindrical shape, and is made of, for example, a conductive material such a metal and an alloy. Examples of the conductive material include aluminum, an aluminum alloy, iron and stainless steel.

An electrode group 2 is formed, for example, by sandwiching a separator between a sheet-form positive electrode and a sheet-form negative electrode, winding the resultant into a spiral form, and then pressing the whole of the resultant into a flat form. The positive electrode (not illustrated) comprises a current collector, and a positive electrode active material layer laminated onto one surface or each surface of the current collector. The negative electrode (not illustrated) comprises a current collector, and a negative electrode active material layer laminated onto one surface or each surface of the current collector. A positive electrode tab 3 is welded to the positive electrode current collector of the electrode group 2 by ultrasonic welding (bonding), and is extended upward from the upper end face of the electrode group 2. A negative electrode tab 4 is welded to the negative electrode current collector of the electrode group 2 by ultrasonic welding (bonding), and is extended upward from the upper end face of the electrode group 2. The positive electrode tab 3 and the negative electrode tab 4 are not particularly limited as long as the tabs 3 and 4 can take out electric energy from the positive electrode and the negative electrode of the electrode group 2, respectively. The tabs 3 and 4 may be projections obtained by partially extending the respective current collectors of the positive electrode and the negative electrode. The electrode group 2 is impregnated with an electrolytic solution (not illustrated).

As illustrated in FIG. 2, a lid 5 in a rectangular plate form is seam-welded to an opening in the case 1 by, for example, laser. A laser welded section 6 is formed on the whole of four sides of the lid 5. The lid 5 is made of, for example, a conductive material such as a metal and an alloy. Examples of the conductive material include aluminum, an aluminum alloy, iron and stainless steel. The lid 5 and the case 1 are desirably made of the same material. A port 7 for the injection of the electrolytic solution is made in the lid 5, so as to be in an open state. After the electrolytic solution is injected into the case, the injection port 7 is sealed up with a sealing lid 8.

As illustrated in FIG. 1, a terminal unit 9(+) of the positive electrode and a terminal unit 9(−) of the negative electrode are provided in the lid 5. The positive electrode terminal unit 9(+) comprises a positive electrode lead 10a, a first internal insulator 11a, a first insulting member 12a and a positive electrode external terminal 13a. The negative electrode terminal unit 9(−) comprises a negative electrode lead 10b, a second internal insulator 11b, a second insulating member 12b and a negative electrode external terminal 13b.

Two rectangular concaves 14 are made in the outside surface of the lid 5. The positive electrode external terminal 13a is received in one of the concaves 14 while the negative electrode external terminal 13b is received in the other concave 14. A first through hole 15a and a second through hole 15b are made in the concaves 14, respectively.

The positive electrode lead 10a and the negative electrode lead 10b are in the form of rectangular plates comprising through holes 16 as holes into which axial sections of the positive and negative electrode external terminals 13a and 13b are to be fitted, respectively. The positive electrode lead 10a and the negative electrode lead 10b are positioned inside the case 1. The positive electrode lead 10a is electrically connected to the positive electrode tab 3 by, for example, welding. The negative electrode lead 10b is electrically connected to the negative electrode tab 4 by, for example, welding.

The first internal insulator 11a is in the form of a rectangular plate comprising a through hole 17 communicating with the first through hole 15a in the lid 5 and the through hole 16 in the positive electrode lead 10a. The first internal insulator 11a is arranged between the inside surface of the lid 5 and the positive electrode lead 10a to insulate the lid 5 and the positive electrode lead 10a electrically from each other. The second internal insulator 11b is in the form of a rectangular plate comprising a through hole 17 communicating with the second through hole 15b in the lid 5 and the through hole 16 in the negative electrode lead 10b. The second internal insulator 11b is arranged between the inside surface of the lid 5 and the negative electrode lead 10b to insulate the lid 5 and the negative electrode lead 10b electrically from each other.

As illustrated in FIG. 3, the first insulating member 12a and the second insulating member 12b each comprise a cylindrical section 18 in a cylindrical form, a flange section 19 formed into a flange form so as to be fitted to an end of an opening in the cylindrical section 18, a side wall section 20 rising upward from four sides of the flange section 19, and two projections 211 and 212 to which bus bars are to be fixed. The two projections 211 and 212 are located to be projected upward from the upper end faces of two sides opposed to each other, out of the four sides of the side wall section 20 of the first or second insulating member 12a or 12b. The projections 211 and 212 are each positioned at the center of each of the top end faces of the side wall sections 20. The projections 211 and 212 are each in the form of a circular column having a size substantially equal to the size of each hole in each of the bus bars, and include a hook 22 with an upper end. The hook 22 is enlarged into the shape of a circular truncated cone.

One of the two ends of an opening in each of the cylindrical sections 18 of the first and second insulating members 12a and 12b is inserted into either one of the first and second through holes 15a and 15b inside the concaves 14 in the lid 5. The other opening end of each of the cylindrical sections 18 is inserted into the through hole 17 in the first or second internal insulator 11a or 11b. The flange sections 19 of the first and second insulating members 12a and 12b cover the surroundings of the first and second through holes 15a and 15b inside the concaves 14 in the lid 5.

As illustrated in FIG. 1, the positive electrode external terminal 13a and the negative electrode external terminal 13b each comprise a rectangular head section 23 and an axial section 24 extended downward from the head section 23. As illustrated in FIG. 3, the head sections 23 of the positive and negative electrode external terminals 13a and 13b are held in spaces surrounded by the flange sections 19 and the side wall sections 20 of the first and second insulating members 12a and 12b, respectively. The axial sections 24 of the positive and negative electrode external terminals 13a and 13b are inserted into the cylindrical sections 18 of the first and second insulating members 12a and 12b, and the through holes 16 in the positive and negative electrode leads 10a and 10b, respectively, so that the lower ends of the axial sections 24 are projected from the through holes 16.

As for each of the positive and negative electrode external terminals 13a and 13b, in the case of pressing the axial section 24 in the axial direction while the position of the head section 23 is fixed, the axial section 24 is deformed to make the diameter thereof large (i.e., is deformed to be expanded) as illustrated in FIG. 3. As a result, the first insulating member 12a, which is positioned between the axial section 24 of the positive electrode external terminal 13a and the first through hole 15a in the lid 5, is pressed, which causes the first insulating member 12a to adhere closely to the first internal insulator 11a, and further causes the axial section 24 of the positive electrode external terminal 13a to adhere closely to the through hole 16 in the positive electrode lead 10a. Moreover, the second insulating member 12b, which is positioned between the axial section 24 of the negative electrode external terminal 13b and the second through hole 15b in the lid 5, is pressed, which causes the second insulating member 12b to adhere closely to the second internal insulator 11b, and further causes the axial section 24 of the negative electrode external terminal 13b to adhere closely to the through hole 16 in the negative electrode lead 10b. In other words, the positive and negative electrode external terminals 13a and 13b are caulked and fixed into the first and second through holes 15a and 15b in the lid 5 through the first insulating member 12a and the first internal insulator 11a and through the second insulating member 12b and the second internal insulator 11b, respectively, and further the positive and negative electrode terminals 13a and 13b are caulked and fixed also to the positive and negative electrode leads 10a and 10b, respectively. In this way, the positive and negative electrode external terminals 13a and 13b are fixed to the lid 5 in the state that electric insulation thereof from each other and air-tightness therein are kept. Furthermore, the positive electrode external terminal 13a and the positive electrode lead 10a are fixed to each other in the state that electric connection is kept therebetween. The negative electrode external terminal 13b and the negative electrode lead 10b are also fixed to each other in the state that electric connection is kept therebetween.

FIG. 4 illustrates an embodiment of a battery module comprising a plurality of (3, for example) batteries 30 having the same structure as described above. A battery module 31 comprises bus bars 32. The bus bars 32 are used to interconnect the batteries to each other, or take out electric energy from the batteries. Each of the bus bars 32 is made of a conductive material such as a metal. In order to connect two adjacent batteries electrically to each other, some of the bus bar 32 each comprise a pair of holes $33_1$ and $33_2$ into which the two projections $21_1$ and $21_2$ of the first or second insulating member of one of the two batteries 30 are fitted, and a pair of holes $34_1$ and $34_2$ into which the two projections $21_1$ and $21_2$ of the first or second insulating member of the other battery 30 are fitted.

The two projections $21_1$ and $21_2$ of the second insulating member 12b of the battery 30 positioned in the rear of the battery module in FIG. 4 are inserted and fitted into the paired holes $33_1$ and $33_2$ in the first bus bar 32. Into the paired holes $34_1$ and $34_2$ in this bus bar 32 are inserted and fitted the two projections $21_1$ and $21_2$ of the first insulating member 12a of the battery 30 in the middle. Furthermore, into the paired holes $33_1$ and $33_2$ in the second bus bar 32 are inserted and fitted the two projections $21_1$ and $21_2$ of the first insulating member 12a of the battery 30 in the middle. Moreover, into the paired holes $34_1$ and $34_2$ in this bus bar 32 are inserted and fitted the two projections $21_1$ and $21_2$ of the first insulating member 12a of the battery 30 in the front. The hooks 22 of the projections $21_1$ and $21_2$ prevent the bus bars 32 from falling out from the projections $21_1$ and $21_2$, respectively. In this way, the three batteries 30 are fixed through the two bus bars 32. As illustrated in FIG. 5, in this state, plural points (for example, two points) of the first bus bar 32 that are between the holes $33_1$ and $33_2$ are welded to the head section 23 of the negative electrode external terminal 13b of the battery 30 in the rear. Simultaneously, plural points (for example, two points) of this bus bar 32 that are between the holes $34_1$ and $34_2$ are welded to the head section 23 of the positive electrode external terminal 13a of the battery 30 in the middle. Moreover, plural points (for example, two points) of the second bus bar 32 that are between the holes $33_1$ and $33_2$ are welded to the head section 23 of the negative electrode external terminal 13b of the battery 30 in the middle, and further plural points (for example, two points) of this bus bar 32 between the holes $34_1$ and $34_2$ are welded to the head section 23 of the positive electrode external terminal 13a of the battery 30 in the front. In this way, the three batteries 30 are electrically connected to each other in series through the bus bars 32. Each reference number 35 in FIGS. 4 and 5 represents welded sections. The connection between the batteries 30 is not limited to series connection, and may be parallel connection.

In the battery module 31 in FIG. 4, two of the bus bars 32 may be used as an input terminal and an output terminal of the battery module, respectively. Holes $34_1$ and $34_2$ in one of the two bus bars 32 are fitted onto the two projections $21_1$ and $21_2$ of the first insulating member 12a of the battery 30 in the rear in FIG. 4, and then the bus bar 32 is welded to the head section 32 of the positive electrode external terminal 13a. As a result, this bus bar 32 can be used as the positive electrode terminal of the battery module. Holes $33_1$ and $33_2$ in the other bus bar 32 are fitted onto the two projections $21_1$ and $21_2$ of the second insulating member 12b of the battery 30 in the front in FIG. 4, and then the bus bar 32 is welded to an upper part of the head section 32 of the negative electrode external terminal 13b. As a result, this bus bar 32 can be used as the negative electrode terminal of the battery module.

In the state that the projections $21_1$ and $21_2$ of the first and second insulating sections 12a and 12b are fitted and fixed into the holes $33_1$ and $33_2$ and the holes $34_1$ and $34_2$ in the bus bars 32, the position gap between the positive and negative electrode external terminals 13a and 13b, and the bus bars 32 does not occur. Thus, these members can easily be welded. Examples of the welding include laser beam welding, resistance welding, and ultrasonic welding (bonding). In a case where the external terminals are welded to the bus bars by laser beam welding, a welding failure occurs when the terminals do not adhere closely to welding surfaces of the bus bars. Thus, at the time of the laser beam welding, it is necessary to use complicate tools that press the bus bars near sections to be welded so as to be fixed. The tools may be simple pressing tools since the members are already in position.

The material of the first and second insulating members 12a and 12b, which are resin molded products arranged between the external terminals of each of the batteries and the lid thereof, is desirably a resin material having a high melting point when the battery is charged and/or discharged at a large current. Typical examples of the resin include tetrafluoroethylene/perfluoroalkyl vinyl ether copolymer (hereinafter referred to as "PFA"), and polyphenylene sulfide (PPS). The material which forms the first and second internal insulators 11a and 11b is not particularly limited, and may be similar to the material of the first and second insulating members 12a and 12b.

It is also possible to divide the first or second insulating member 12a or 12b into two, and use three types of resin molded products, including the two divided insulating members and the first or second internal insulator 11a or 11b. An example thereof is illustrated in FIG. 6. In FIG. 6, a first insulating member 12a comprises two components, that is, a first insulating gasket 40 and a first external insulator 41. A second insulating member 12b comprises two components, that is, a second insulating gasket 40 and a second external insulator 41. The first and second insulating gaskets 40 each comprise a cylindrical section 40a in a circular cylindrical form, and a flange section 40b formed into a flange form so as to be fitted to one of two ends of an opening in the cylindrical section 40a. The cylindrical sections 40a of the first and second insulating gaskets 40 are inserted to the first and second through holes 15a and 15b, respectively, in the concaves 14 in the lid 5, and the other opening end of each of the cylindrical sections 40a is inserted into the through hole 17 in the first or second internal insulator 11a or 11b. The flange sections 40b of the first and second insulating gaskets 40 cover the surroundings of the first and second through holes 15a and 15b, respectively, inside the concaves 14 in the lid 5.

The first and second external insulators 41 each comprise a base section 41b in the form of a rectangular plate comprising a through hole 41a, a side wall section 41c rising upward from four sides of the base section 41b, and projections $21_1$ and $21_2$ extending upward from the upper end face of the side wall section 41c. The first and second external insulators 41 are arranged in the concaves 14 in the lid 5, respectively, and the flange sections 40b of the first and second insulating gaskets 40 are inserted into the through holes 41a in the first and second external insulators 41, respectively.

The head sections 23 of the positive and negative electrode external terminals 13a and 13b are held in spaces surrounded by the flange sections 40b of the first and second insulating gaskets 40, the base sections 41b of the first and second external insulators 41, and the side wall sections 41c thereof, respectively. The axial sections 24 of the positive and negative electrode external terminals 13a and 13b are inserted into the cylindrical sections 40a of the first and second insulating gaskets 40 and the through holes 16 in the positive and negative electrode leads 10a and 10b, respectively, and the lower ends of the axial sections 24 are projected from the through holes 16, respectively.

As illustrated in FIG. 6, in the case of pressing the axial sections 24 in the respective axial directions while the positions of the head sections 23 are fixed, the axial sections 24 are each deformed to make the diameter thereof large (i.e., deformed to be expanded). As a result, the first and second insulating gaskets 40 positioned between the axial section 24 of the positive electrode external terminal 13a and the first through hole 15a in the lid 5 and between the axial section 24 of the negative electrode external terminal 13b and the second through hole 15b in the lid 5, respectively, are pressed. Additionally, this pressing causes the insulating gaskets 40 to adhere closely to the internal insulators 11 and the external insulators 41, and further causes the axial sections 24 of the positive and negative electrode external terminals 13a and 13b to adhere closely to the through holes 16 in the positive and negative electrode leads 10, respectively. In other words, the positive and negative electrode external terminals 13a and 13b are caulked and fixed to the lid 5 through the external insulators 41, the insulating gaskets 40 and the internal insulators 11, and further caulked and fixed also to the positive and negative electrode leads 10a and 10b, respectively. In this way, the positive and negative electrode external terminals 13a and 13b are fixed to the lid 5 in the state that electric insulation thereof from each other and air-tightness therein are kept. Furthermore, the positive electrode external terminal 13a and the positive electrode lead 10a are fixed to each other in the state that electric connection is kept therebetween. The negative electrode external terminal 13b and the negative electrode lead 10b are also fixed to each other in the state that electric connection is kept therebetween.

Components important for keeping the air-tightness by the caulking and fixing are the insulating gaskets 40. By using, as the insulating gaskets 40, molded products made of a resin material having a higher melting point than the external insulators 41 and the internal insulators 11, the aright-tightness can be certainly kept at high temperature (for example, 100° C. or lower) while the use amount of the resin material is restrained to a small value. Thus, even when PFA, which is an expensive resin material, is used for the insulating gaskets 40, an increase in costs for the material is restrained. When a harder material is used for the external insulators 41 than for the insulating gaskets 40, the mechanical strength can be made high. Thus, when the external terminals rotate, the risk of a short circuit can be made low.

Furthermore, the insulating gaskets 40 can be made into a smaller shape than the first and second insulating members 12a and 12b in FIG. 3; thus, a large number of insulating gaskets equivalent to the gaskets 40 can be formed by means of a mold. As a result, the gasket productivity is raised so as to produce an advantageous effect of restraining costs for processing the resin into the gaskets. As a result, costs for the gaskets can be decreased. The resin material having a high melting point is desirably a fluorine-containing resin, which is excellent in resistance against electrolytic solutions. A typical example of the resin is tetrafluoroethylene/perfluoroalkyl vinyl ether (PFA), which has a melting point of 300 to 310° C.

As for PFA, the melt flow rate (hereinafter referred to as "MFR") thereof is desirably 5 g/10-minute or less. In this case, the resin is restrained from flowing at high temperature, so as to enhance the air-tightness. The MFR is measured under the following conditions: a temperature of 372° C. and a load of 5 kg.

The thickness of the flange section 40b of each of the insulating gaskets 40 is desirably larger than that of the base section 41b of the corresponding external insulator 41. In this case, the flange section 40b of the insulating gasket 40, which is important for keeping the air-tightness certainly, is first crushed at the time of the caulking. Thereafter, the flange section 40b is fixed between the head section 23 of the positive or negative electrode external terminal 13a or 13b and the lid 5 while the gap between the flange section 40b and the base section 41b of the external insulator 41 is embedded with the flange section 40b. This makes it possible to eliminate the gap between the insulating gasket 40 and the external insulator 41 to form a structure for preventing a short circuit based on migration.

The resin used for the external insulator 41 is not particularly limited, and is preferably a resin that is lower in melting point and harder than the resin used for the insulating gasket 40. Specifically, the external insulator is desirably lower in melting point and larger in Rockwell hardness than the insulating gasket, which makes the following possible: when rotating force acts on the positive or negative electrode external terminal 13a or 13b around its caulked section, the breaking of the external insulator due to the force applied to the external terminal head section 23 and the lid 5 is avoided, so that a short circuit caused by contact between the external terminal head section 23 and the lid 5 is prevented.

When PFA is used for the insulating gasket 40, the Rockwell hardness of PFA is about R50. Examples of a material having a larger Rockwell hardness include polypropylene (PP), which has a hardness of R85 to 110 and a melting point of 160 to 170° C., polyethylene terephthalate (PET), which has a hardness of R110 to 120 and a melting point of 264° C., and polyphenylene sulfide (PPS), which has a hardness of R118 to 124 and a melting point of 280 to 290° C. Rockwell hardness is prescribed in JIS K 7202-2, "Plastic—Method for Determining Hardness—Part 2: Rockwell Hardness".

The external insulator 41 is desirably an injection molded product. According to PFA having an MFR of 5 g/10-minute or less, the air-tightness can be certainly kept at a high temperature; however, the resin is not easily subjected to injection molding. By use of an injection molded product as the external insulator 41, the flexibility of the shape change thereof is increased. In addition, a polarity indication, such a "+" mark or a "−" mark, can be formed in the external insulator 41, which is used to fasten the positive electrode terminal or negative electrode terminal, or the external insulators 41 can be colored into different colors. Thus, the plus and minus polarities can easily be distinguished from each other. FIG. 7 illustrates an example in which a "+" mark 42 is indicated in the upper end face of the side wall section 41c of the positive electrode external insulator 41. Examples of the resin that can be injection-molded include PP, PET and PPS.

Resins used for the first and second internal insulators 11a and 11b are each not particularly limited. The resins are each preferably a resin having a lower melting point than the resin used for the insulating gaskets 40. When the resin can be subjected to injection molding, the flexibility of the shape change of the molded product favorably increases. Specific examples of the resin include PP, PET and PPS.

The shape of the projections $21_1$ and $21_2$ is not limited to the shape illustrated in FIG. 3. It is sufficient for the shape as long as the bus bars 32 do not fall out from the projections. As illustrated in, for example, FIG. 8, as for the projections $21_1$ and $21_2$, a component comprising an annular upper end, in which a part of the circumference of the upper end is enlarged outward, may be used as each hook 22.

The number of the projections provided in each of the insulating members is not limited to two, and may be one, or three or more. The number of the projections mentioned herein is not the sum of those provided in the first and second insulating members, but the number in each of the members. The number of the projections provided in the first insulating member may be equal to or different from that of the projections located in the second insulating member.

Typical examples of the material of the external terminals are described herein. In the case of a lithium ion secondary battery in which a carbon-based material is used as a negative electrode active material, aluminum or an aluminum alloy is generally used for the positive electrode terminal while a metal such as copper, nickel or iron plated with nickel is used for the negative electrode terminal. When lithium titanate is used as the negative electrode active material, it is possible to use, besides the above, aluminum or an aluminum alloy for the negative electrode terminal.

In the battery in FIG. 1, the tabs of both of the positive and negative electrodes are extended from one of the two end faces of the electrode group; however, the method for extending the tabs is not limited thereto. For example, it is possible to extend a positive electrode tab from one of the two end faces of the electrode group and extend a negative electrode tab from the other end face. In this case, it is possible to project current collectors, on each of which no active material is carried, from both end faces of the electrode group, respectively, and use the projected current collectors as positive and negative electrode tabs, respectively.

In the battery of FIG. 1, the spiral, flat electrode group is used; however, the structure of the electrode group is not particularly limited, and may be, for example, a laminated type electrode group in which positive electrodes and negative electrodes are alternately laminated while a separator is interposed between any adjacent two electrodes.

The following will describe the positive electrode, the negative electrode, the separators and the electrolytic solution used in the battery in FIG. 1.

The positive electrode is formed by applying a slurry containing a positive electrode active material onto a current collector made of aluminum foil or aluminum alloy foil. The positive electrode active material is not particularly limited, and may be an oxide, a sulfide, a polymer or some other material capable of adsorbing and releasing lithium. Preferred examples of the active material include lithium-manganese composite oxide, lithium-nickel composite oxide, lithium-cobalt composite oxide, and lithium-iron phosphate, which each give a high positive electrode potential. The negative electrode is formed by applying a slurry containing a negative electrode active material onto a current collector made of aluminum foil or aluminum alloy foil. The negative electrode active material is not particularly limited, and may be a metal oxide, a metal sulfide, a metal nitride, an alloy or some other material capable of adsorbing and releasing lithium. The active material is preferably a substance having a nobler potential for adsorbing and releasing lithium ions than the potential of metallic lithium by 0.4 V or more. Since the negative electrode active material having such a potential for adsorbing and releasing lithium ions restrains alloy-reaction between aluminum or any aluminum alloy and lithium, aluminum or an aluminum alloy can be used for the negative electrode current collector and negative-electrode-related constituting members. Examples thereof include titanium oxide, lithium-titanium oxide, tungsten oxide, amorphous tin oxide, tin silicon oxide, and silicon oxide. Of these examples, lithium-titanium composite oxide is preferred. The separators may each be, for example, a finely porous membrane, a woven cloth piece or a nonwoven cloth piece, or a laminated product in which the same or different kind of members that are each selected from these examples are laminated onto each other. Examples of the material that forms the separators include polyethylene, polypropylene, ethylene-propylene copolymer, and ethylene-butene copolymer.

The electrolytic solution may be a nonaqueous electrolytic solution in which an electrolyte (for example, a lithium salt) is dissolved in an nonaqueous solvent. Examples of the nonaqueous solvent include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. As for the nonaqueous solvent, a single solvent may be used, or two or more solvents may be used in a mixture form. Examples of the electrolyte include lithium perchlorate ($LiClO_4$), lithium hexafluorophosphate ($LiPF_6$), lithium borofluoride ($LiBF_4$), lithium hexafluoroarsenate ($LiAsF_6$) and lithium trifluoromethasulfonate ($LiCF_3SO_3$). These electrolytes may be used either alone or as mixture of two or more types. The amount of the electrolyte dissolved in the nonaqueous solvent may be in the range of 0.2 to 3 mol/L.

Figure 10:
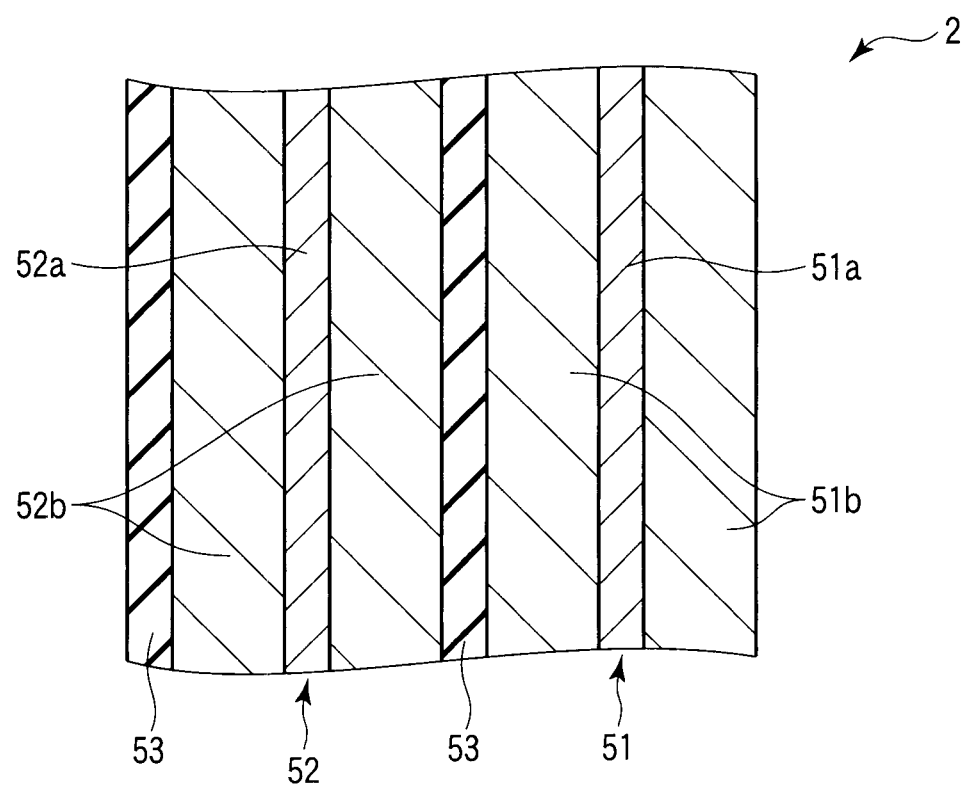
FIG. 10 is a sectional view taken on line X-X in FIG. 9, and illustrates the section as viewed along the direction of arrows.

With reference to FIGS. 9 and 10, the electrode group 2 illustrated in FIG. 1 is described herein. FIG. 9 is a partially-exploded perspective view of the electrode group 2 used in the battery 30 in FIG. 1. FIG. 10 is a sectional view taken on line X-X in FIG. 9, and illustrates the section as viewed along the direction of arrows. As illustrated in FIG. 10, a positive electrode 51 comprises a band-form positive electrode current collector 51a, and positive electrode active material layers 51b that are formed on both surfaces of the positive electrode current collector 51a, respectively. The positive electrode active material layers 51b may each contain a positive electrode active material, a conductive agent, and a binder. The positive electrode current collector 51a may be made of, for example, metal foil. The material that forms the positive electrode current collector 51a may be, for example, aluminum or an aluminum alloy. A negative electrode 52 comprises a band-form negative electrode current collector 52a, and negative electrode active material layers 52b that are formed on both surfaces of the negative electrode current collector 52a, respectively. The negative electrode active material layers 52b may each contain a negative electrode active material, a conductive agent, and a binder. The negative electrode current collector 52a may be made of, for example, metal foil. The material that forms the negative electrode current collector 52a may be, for example, aluminum or an aluminum alloy. One of two separators 53 is arranged between the positive electrode active material layer 51b and the negative electrode active material layer 52b, and the other separator 53 is arranged on the other negative electrode active material layer 52b of the negative electrode 52. Two winding cores in a flat form are used to wind these members (i.e., the lamination) into a flat form. After the lamination is wound by this method, the wound product is made into a desired flat form by pressing. In this way, the flat-form electrode group 2 illustrated in FIG. 1 is obtained.

The structure of the bus bar-fixing sections of the first and second insulating members is not limited to the structure illustrated FIG. 3 or 8. For example, first and second insulating members having structures illustrated in FIGS. 11A and 11B to FIGS. 16A and 16B may be used. FIGS. 11A, 12A, 13A, 14A, 15A, and 16A are each a partial top view of the vicinities of projections $21_1$ and $21_2$ of side wall sections 20 of first and second insulating members 12a and 12b. FIGS. 11B, 12B, 13B, 14B, 15B, and 16B are each a view of a section obtained by cutting sections where positive and negative electrode external terminals 13a and 13b are caulked and fixed to a lid 5 and positive and negative electrode leads 10a and 10b through a first insulating member 12a and a first internal insulator 11a and through a second insulating member 12b and a second internal insulator 11b, respectively. The cutting has been made in parallel to the respective axes of the positive and negative electrode external terminals 13a and 13b. To the same members as those illustrated in FIGS. 1 to 3 are attached the same reference numbers, and description thereof is omitted.

Figure 11A:
FIG. 11A is a partial top view of an example of each of first and second insulating members used in a battery of an embodiment.
Figure 11B:
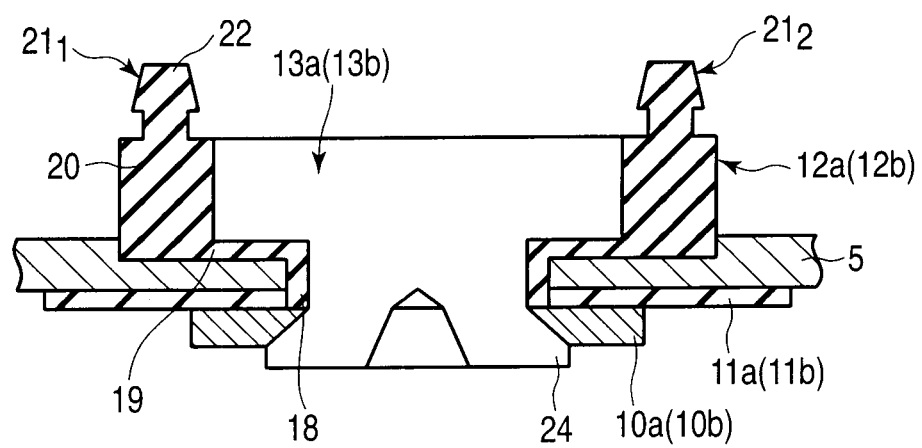
FIG. 11B is a sectional view of caulked sections having the insulating members illustrated in FIG. 11A.
Figure 12A:
FIG. 12A is a partial top view of an example of each of first and second insulating members used in a battery of an embodiment.
Figure 12B:
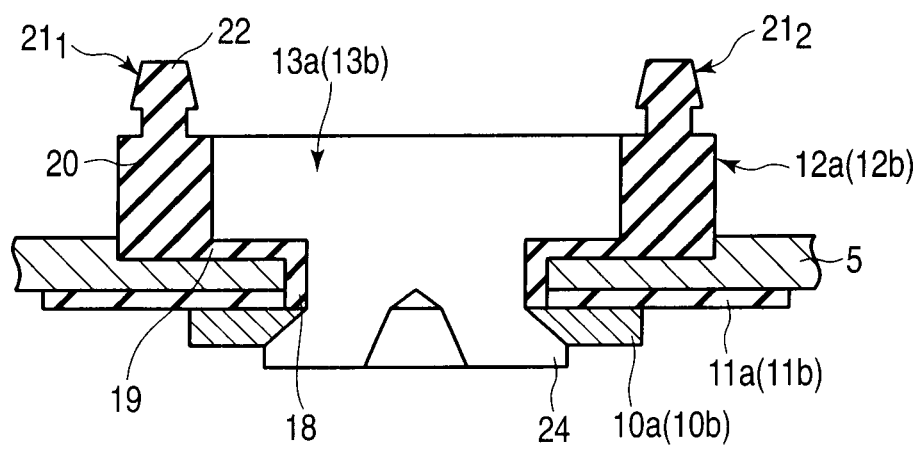
FIG. 12B is a sectional view of caulked sections having the insulating members illustrated in FIG. 12A.

FIGS. 11A and 11B illustrate an embodiment in which top end sections of columnar projections $21_1$ and $21_2$ which are each enlarged into a polyangular pyramidal truncated cone form are used as hooks 22. FIGS. 12A and 12B illustrate an embodiment in which top end sections of columnar projections $21_1$ and $21_2$ which are each enlarged into a quadrangular pyramidal truncated cone form are used as hooks 22. The polygon as the shape of the upper face of the polyangular pyramidal truncated cone is not limited to a dodecagon as illustrated in FIGS. 11A and 11B, or a quadrangle as illustrated in FIGS. 12A and 12B, and may be any shape having three or more sides. The polygon may be made into various shapes such as a triangle, a pentagon, and a hexagon.

Since the hooks 22 in the polyangular pyramidal truncated cone form are projected from the circumferential surfaces of the projections $21_1$ and $21_2$, the bus bars 32 can be prevented from falling out from the projections $21_1$ and $21_2$.

Figure 13A:
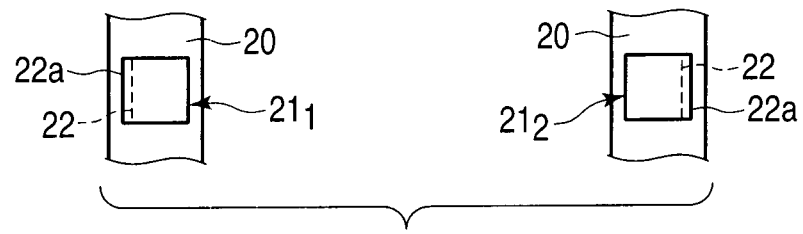
FIG. 13A is a partial top view of an example of each of first and second insulating members used in a battery of an embodiment.
Figure 13B:
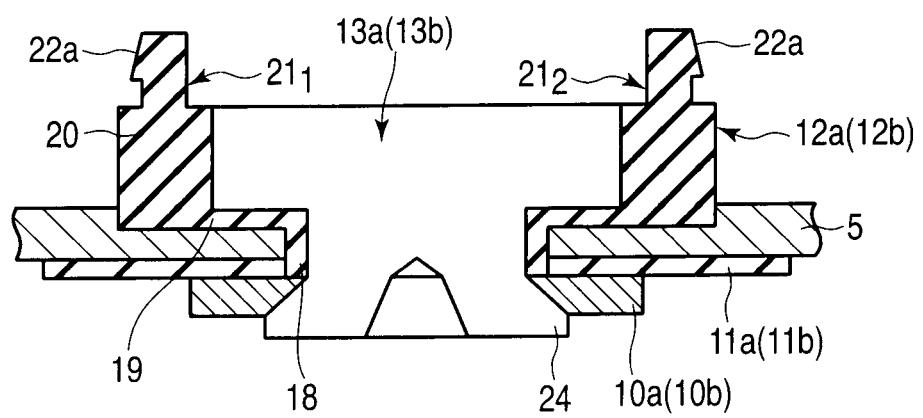
FIG. 13B is a sectional view of caulked sections having the insulating members illustrated in FIG. 13A.

In FIGS. 13A and 13B, projections $21_1$ and $21_2$ are each in the form of a quadrangular prism. An outward side face 22a of the top end section of each of the projections $21_1$ and $21_2$ is inclined, and this inclined face is projected outward to a larger degree toward the bottom of the face. The respective portions projected outward function as the hooks 22. Since the polyangular-prism-form hooks 22 are projected out from the side faces of the projections $21_1$ and $21_2$, the bus bars 32 can be prevented from falling out from the projections $21_1$ and $21_2$.

Figure 15A:
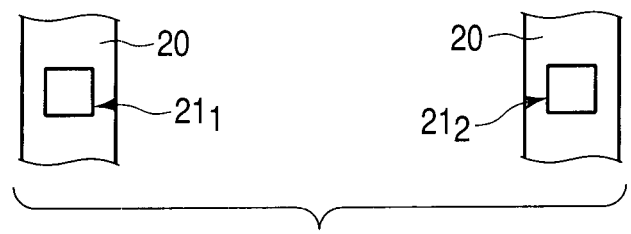
FIG. 15A is a partial top view of an example of each of first and second insulating members used in a battery of an embodiment.
Figure 15B:
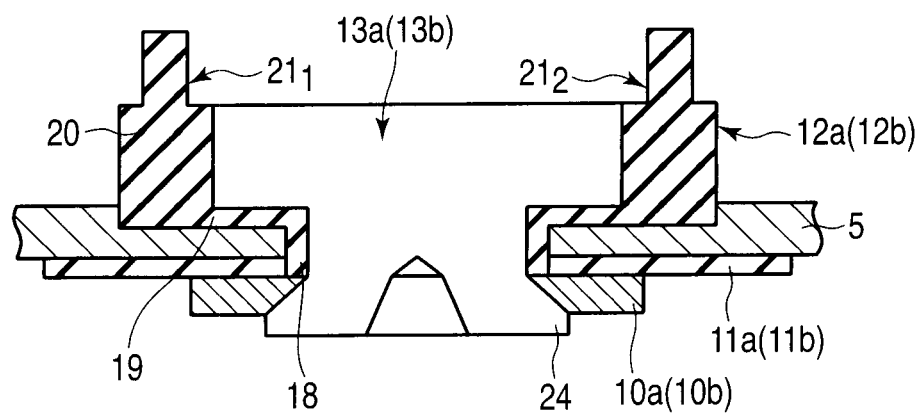
FIG. 15B is a sectional view of caulked sections having the insulating members illustrated in FIG. 15A.

FIGS. 14A and 14B, as well as FIGS. 15A and 15B, illustrate an embodiment in which no hooks 22 are provided. As illustrated in FIGS. 14A and 14B, projections $21_1$ and $21_2$ are each in a columnar form. Since no hooks 22 are provided, the bus bars 32 can be quickly fitted to the projections $21_1$ and $21_2$, so as to shorten a period required for operation for welding the bus bars 32 to the positive and negative electrode external terminals 13a and 13b. By making the diameter of the projections $21_1$ and $21_2$ larger than that of the holes in the bus bars 32, the bus bars 32 can be prevented from falling out from the projections $21_1$ and $21_2$. Even when the diameter of the projections $21_1$ and $21_2$ is made large, the projections $21_1$ and $21_2$ can be inserted into the holes in the bus bars 32 since the projections $21_1$ and $21_2$ are made of resin.

As illustrated in FIGS. 15A and 15B, projections $21_1$ and $21_2$ are each in the form of a quadrangular prism. Since no hooks 22 are provided, the bus bars 32 can be quickly attached to the projections $21_1$ and $21_2$, so as to shorten a period required for operation for welding the bus bars 32 to the positive and negative electrode external terminals 13a and 13b. Furthermore, by making the size of the projections $21_1$ and $21_2$ larger than the diameter of the holes in the bus bars 32, the bus bars 32 can be prevented from falling out from the projections $21_1$ and $21_2$.

Figure 16A:
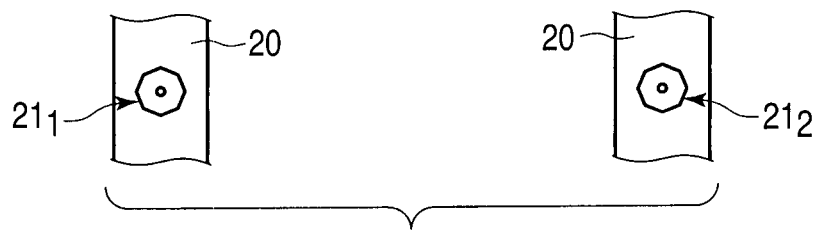
FIG. 16A is a partial top view of an example of each of first and second insulating members used in a battery of an embodiment.
Figure 16B:
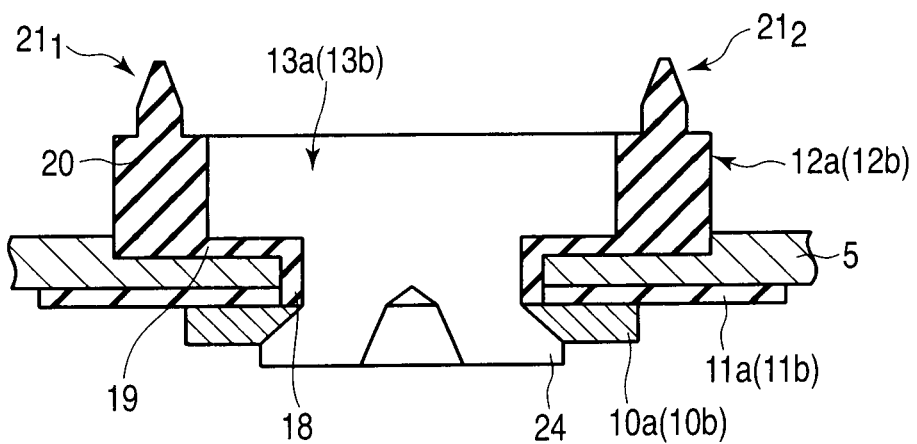
FIG. 16B is a sectional view of caulked sections having the insulating members illustrated in FIG. 16A.

As illustrated in FIGS. 16A and 16B, projections $21_1$ and $21_2$ are each in the form of a polyangular prism (for example, an octagonal prism). As for the projections $21_1$ and $21_2$, the diameter thereof continuously becomes smaller from the middle toward the top end thereof. The tips of the projections $21_1$ and $21_2$ are each in the form of a polyangular pyramid; therefore, the bus bars 32 can be quickly attached to the projections $21_1$ and $21_2$ so as to shorten a period required for operation for welding the bus bars 32 to the positive and negative electrode external terminals 13*a* and 13*b*.

As described above, batteries of each of the embodiments, which are batteries in a battery pack, have a function of fixing bus bars by means of insulating members arranged between external terminals of each of the batteries and a lid. As a result, it is possible to interconnect the batteries to each other or take out electric energy from the batteries. By caulking and fixing the external terminals to the lid through the insulating members, bus bar-fixing sections can easily be attached. By providing the bus bars with a function of being fitted to the insulating members, the external terminals of the batteries and the bus bars can be restrained from not being relatively in position when welded, so that a welding failure can be prevented. Accordingly, the batteries of the embodiments can provide a battery pack high in reliability and safety. Furthermore, the embodiments produce an advantageous effect that the structure of tools for positioning and fixing the bus bars to the batteries when welded is made simple since the external terminals and the bus bars are already fixed to each other.

Thus, the embodiments make it possible to restrain a welding failure caused by the position gap between the external terminals and the bus bars when welded, so as to provide batteries that give a battery pack high in reliability and safety, and provide a battery module and a method of manufacturing the battery module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
    a case;
    an electrode group provided in the case and comprising a positive electrode and a negative electrode;
    a lid provided to an opening in the case and comprising a first through hole and a second through hole;
    a positive electrode external terminal comprising a head section including a top surface for welding attachment to a first electrical bus, and an axial section extended from the head section, and the axial section being caulked and fixed into the first through hole in the lid;
    a negative electrode external terminal comprising a head section including a top surface for welding attachment to a second electrical bus, and an axial section extended from the head section, and the axial section being caulked and fixed into the second through hole in the lid;
    a first insulating member arranged between the lid and the positive electrode external terminal, and comprising a first external insulator comprising a side wall section thereof which surrounds a circumference of the head section of the positive electrode external terminal and which extends toward the top surface of the head section of the positive electrode external terminal, a bus bar-fixing section on a top end face of the side wall section of the first insulating member, and a first insulating gasket comprising a cylindrical section inserted into the first through hole in the lid; and
    a second insulating member arranged between the lid and the negative electrode external terminal, and comprising a second external insulator comprising a side wall section thereof which surrounds a circumference of the head section of the negative electrode external terminal and which extends toward the top surface of the head section of the negative electrode external terminal, a bus bar-fixing section on a top end face of the side wall section of the second external insulator, and a second insulating gasket comprising a cylindrical section inserted into the second through hole in the lid,
    wherein the first and second insulating gaskets members each comprise a tetrafluoroethylene/perfluoroalkyl vinyl ether copolymer, and
    the first and second external insulators each comprise a resin having a lower melting point than the tetrafluoroethylene/perfluoroalkyl vinyl ether copolymer.

2. The battery according to claim 1, wherein the bus bar-fixing section of the first external insulator and the bus bar-fixing section of the second external insulator each comprise a columnar shape.

3. The battery according to claim 2, wherein the bus bar-fixing section of the first external insulator and the bus bar-fixing section of the second external insulator each comprise a hook projected outward.

4. The battery according to claim 1, wherein the bus bar-fixing section of the first external insulator and the bus bar-fixing section of the second external insulator each comprise a polyangular prismatic shape.

5. The battery according to claim 4, wherein the bus bar-fixing section of the first external insulator and the bus bar-fixing section of the second external insulator each comprise a hook projected outward.

6. The battery according to claim 1, wherein a color of the first external insulator is different from a color of the second external insulator.

7. The battery according to claim 1, wherein at least one of the first external insulator and the second external insulator comprises a polarity indication.

8. The battery according to claim 1, further comprising:
    a positive electrode lead arranged in the case, connected electrically to the positive electrode, and the positive electrode lead being caulked and fixed to the axial section of the positive electrode external terminal;
    a first internal insulator arranged between the positive electrode lead and the lid;
    a negative electrode lead arranged in the case, connected electrically to the negative electrode, and the negative electrode lead being caulked and fixed to the axial section of the negative electrode external terminal; and
    a second internal insulator arranged between the negative electrode lead and the lid.

9. The battery according to claim 1, wherein the resin having the lower melting point than the tetrafluoroethylene/perfluoroalkyl vinyl ether copolymer comprises at least one resin selected from the group consisting of polypropylene, polyethylene terephthalate and polyphenylene sulfide.

10. A battery module comprising:
    a plurality of batteries, each being the battery according to claim 1;
    said first electrical bus; and
    said second electrical bus,
    wherein said first electrical bus is fixed to the bus bar-fixing section of the first insulating member, and said second electrical bus is fixed to the bus bar-fixing section of the second insulating member.

11. A method of manufacturing the battery module according to claim 10, said method comprising:

fixing said first electrical bus to the bus bar-fixing section of the first insulating member;
fixing said second electrical bus to the bus bar-fixing section of the second insulating member;
welding said first electrical bus to the top surface of the positive electrode external terminal; and
welding said second electrical bus to the top surface of the negative electrode external terminal.

12. The method of manufacturing a battery module according to claim 11, wherein the welding is laser beam welding.

13. A battery module comprising:
a plurality of batteries, each of the plurality of batteries being the battery according to claim 1;
said first electrical bus; and
said second electrical bus;
wherein said first electrical bus comprises a hole into which the bus bar-fixing section of the first insulating member is fitted, and said second electrical bus comprises a hole into which the bus bar-fixing section of the second insulating member is fitted.

14. The method of manufacturing the battery module according to claim 13, said method comprising:
fitting the hole in said first electrical bus to the bus bar-fixing section of the first insulating member;
fitting the hole in said second electrical bus to the bus bar-fixing section of the second insulating member;
welding said first electrical bus to the top surface of the positive electrode external terminal; and
welding said second electrical bus to the top surface of the negative electrode external terminal.

15. The method of manufacturing a battery module according to claim 14, wherein the welding is laser beam welding.

* * * * *